(12) United States Patent
Disch et al.

(10) Patent No.: US 9,944,466 B2
(45) Date of Patent: Apr. 17, 2018

(54) CONVEYING APPARATUS FOR FEEDING WASHWARE TO A CONVEYOR WAREWASHER

(75) Inventors: Harald Disch, Elzach (DE); Klaus Padtberg, Korbach (DE); Frank Zoller, Offenburg-Elgersweier (DE)

(73) Assignee: PREMARK FEG L.L.C., Glenview, IL (US)

( * ) Notice: Subject to any disclaimer, the term of this patent is extended or adjusted under 35 U.S.C. 154(b) by 1150 days.

(21) Appl. No.: 13/984,920

(22) PCT Filed: Feb. 28, 2012

(86) PCT No.: PCT/US2012/026846
§ 371 (c)(1),
(2), (4) Date: Aug. 12, 2013

(87) PCT Pub. No.: WO2012/118774
PCT Pub. Date: Sep. 7, 2012

(65) Prior Publication Data
US 2013/0319828 A1    Dec. 5, 2013

(30) Foreign Application Priority Data
Feb. 28, 2011  (DE) .................. 10 2011 004 853

(51) Int. Cl.
*A47L 15/24* (2006.01)
*B65G 17/00* (2006.01)
*A47L 15/00* (2006.01)

(52) U.S. Cl.
CPC ........ *B65G 17/002* (2013.01); *A47L 15/0092* (2013.01); *A47L 15/245* (2013.01); *A47L 15/247* (2013.01)

(58) Field of Classification Search
None
See application file for complete search history.

(56) References Cited

U.S. PATENT DOCUMENTS

RE25,421 E    7/1963  Nolte
3,486,939 A   12/1969 Pinckard
(Continued)

FOREIGN PATENT DOCUMENTS

CN    201768696 U    3/2011
DE       1766212       5/1958
(Continued)

OTHER PUBLICATIONS

PCT, International Search Report and Written Opinion, PCT/US2012/026846 (dated Nov. 5, 2012).

*Primary Examiner* — Michael Barr
*Assistant Examiner* — Jason Riggleman
(74) *Attorney, Agent, or Firm* — Thompson Hine LLP

(57) ABSTRACT

The invention relates to a conveying apparatus (200, 200', 200", 200''') for feeding washware (100, 101) to at least one conveyor belt (50, 51, 52) of a commercial conveyor warewasher (1), with a conveying system (201) for conveying the washware (100, 101), in particular for feeding trays or tray-like washware (100), of cutlery and/or of other washware (101). The invention is characterized by an unloading station (202, 202', 202", 202''') for automatically unloading the washware (100, 101) from the conveying apparatus (200, 200', 200", 200''') transversely to the conveying direction of the conveying system (201), in which the trays (100), with or without cutlery (103) lying on them, can be oriented on edge and parallel to the transport direction of the conveying system (201), so as to be capable of being placed onto a conveyor belt (50) of the conveyor warewasher. The invention relates, furthermore, to a flight-type warewasher (1) and to a combination of this warewasher (1) and of the conveying apparatus (200, 200', 200", 200'''). The invention relates, moreover, to a method for loading a flight-type warewasher (1), by means of a conveying apparatus (200, 200', 200", (Continued)

200''') and to a preferred use of same for loading a warewasher with trays or tray-like washware (100).

6 Claims, 11 Drawing Sheets

(56) References Cited

U.S. PATENT DOCUMENTS

| | | | | |
|---|---|---|---|---|
| 3,584,752 A | * | 6/1971 | Ettlinger | B65G 47/24 414/425 |
| 3,738,465 A | * | 6/1973 | Ettlinger, Jr. | A47B 33/00 193/47 |
| 4,281,675 A | | 8/1981 | Pure | |
| 6,026,831 A | | 2/2000 | Jarvis | |
| 6,530,996 B2 | | 3/2003 | Varpio | |

FOREIGN PATENT DOCUMENTS

| | | |
|---|---|---|
| DE | 1928650 | 1/1971 |
| DE | 2439836 | 3/1976 |
| GB | 2155772 | 10/1985 |
| GB | 2156326 | 10/1985 |
| JP | 2000-93378 A | 4/2000 |
| JP | 2000-116586 A | 4/2000 |
| WO | 2012/078424 | 6/2002 |

* cited by examiner

CONVEYING APPARATUS FOR FEEDING WASHWARE TO A CONVEYOR WAREWASHER

The invention relates to a conveying apparatus for feeding washware, a conveyor warewasher and to a combination of the abovementioned conveying apparatus and of this conveyor warewasher. Moreover, the invention relates to a method for loading a conveyor warewasher, and to a preferred use of the conveying apparatus for automatically loading the conveyor warewasher with trays or tray-like washware.

Accordingly, the invention relates particularly to a conveyor warewasher with at least one washing zone and at least one final rinse zone and with a transport apparatus for transporting washware through the at least one washing zone and the at least one final rinse zone.

The conveyor warewasher according to the invention is, in particular, a commercial conveyor warewasher and may be designed as a flight-type warewasher or as a rack-conveyor warewasher.

Conveyor warewashers are employed in the commercial sector. In contrast to domestic warewashers in which the washware to be cleaned remains at a fixed location in the machine during cleaning, in conveyor warewashers the washware is transported through various treatment zones of the machine.

In conveyor warewashers, the washware, such as, for example, trays, crockery, pots, glasses, cutlery and other utensils to be cleaned, is conveyed through a plurality of treatment zones, such as, for example, pre-washing zone(s), main wash zone(s), afterwash or pre-rinse zone(s), final rinse zone(s) and drying zone(s). For transporting washware in a transport direction through the conveyor warewasher, a transport apparatus is used, which usually has compartments for the reception of washware. In a flight-type warewasher, the compartments may be formed by supporting fingers on a conveyor belt of the transport apparatus. In rack-conveyor warewashers, crockery racks, in which compartments may be formed in order to receive the washware to be treated, serve as the transport apparatus. It is conceivable in this case that the crockery racks are transported through the rack-conveyor warewasher by means of a conveying apparatus.

Usually, the washware to be cleaned is pre-sorted before being put into the conveyor belt. For example, the publication U.S. Pat. No. 6,530,996 B2 discloses a rack-conveyor warewasher, in which the washware to be treated is fed, pre-sorted in crockery racks, to the respective treatment zones.

Where trays or tray-like articles are concerned, pre-sorting usually takes place in such a way that the crockery and cutlery batch is picked up from a tray to be cleaned and the tray is subsequently stacked upstream of the transport apparatus or in the incoming region (dirty side) of the conveyor warewasher. The trays from this tray stack are from time to time placed, fully sorted, into the conveyer belt of the warewasher and cleaned. This fully sorted procedure has the advantage that trays cannot throw spray shadows onto smaller washware articles stacked behind the trays.

Furthermore, as a result of this procedure, the stacking and de-stacking workflow is greatly simplified and is more efficient as compared with an intermixing of the washware with the trays to be cleaned.

While the trays from this tray stack are being placed, fully sorted, into the conveyor belt of the warewasher and cleaned, however, it is not possible to clean other washware, such as, for example, plates, dishes or other crockery, since the trays to be placed into the conveyor belt usually have to be placed into the conveyor belt transversely to the transport direction and therefore fill the entire available surface of the conveyor belt. As compared with other types of washware, a relatively large amount of time therefore has to be expended in order to clean trays.

Furthermore, the operating personnel of the conveyor warewasher have to integrate each tray into its workflow twice at the machine inlet: the first time to remove the cutlery and crockery articles from the tray to be cleaned and the second time to actually place the tray into the conveyor belt of the conveyor warewasher.

It is true that German laid-open publication DE 192 86 50 shows an automatic feed of trays. However, these are fed transversely to the transport direction of the warewasher and are also placed into the warewasher transversely thereto, so that the abovementioned problems are still unsolved.

Proceeding from this prior art, the object on which the present invention is based is to develop a conveyor warewasher of the type initially mentioned, in such a way that it makes it possible to configure the overall washing and rinsing process more efficiently, as a result of which, in particular, the work time of the washing personnel can be shortened and the consumption of resources by the warewasher can be reduced.

This object is achieved by means of a conveying apparatus with an unloading station for automatically unloading washware from the conveying apparatus transversely to the conveying direction of the conveying system.

It is therefore proposed, according to the invention, that the trays be set down either directly by the customer or by the washing personnel on a conveying apparatus which conveys the meal batches to the conveyor warewasher. The cutlery and crockery articles are removed manually from the trays there and are placed into the warewasher conveyor belt provided for crockery. The trays are conveyed further on in parallel in the direction of the machine incoming region and are automatically introduced there into a special tray conveyor belt of the warewasher via an unloading station or clocking-in/placing-in station.

The feed of the trays to the clocking-in/placing-in apparatus may take place, for example, clocked in time after clearance via a switch, for example mechanically, optically, inductively, capacitively, etc. or else continuously. The trays are introduced laterally into the tray conveyor belt in a state placed on edge and parallel to the transport direction.

The above object is also achieved by means of a conveyor warewasher with first and second conveyor belts and a transport apparatus having, adjacent to a region between the first and second conveyor belts, one or more essentially vertically extending introduction aids which prevent a situation where, when the first conveyor belt is being loaded with a tray or tray-like washware transversely to its transport direction, the tray or tray-like washware may slip onto the second conveyor belt.

Accordingly, a conveyor warewasher with a transport apparatus is taken as a starting point, which has a first conveyor belt for trays or tray-like washware and a second conveyor belt, running parallel to the first conveyor belt, for other washware, the first conveyor belt having, in comparison with the second conveyor belt, a width reduced in such a way that a tray or tray-like washware can be received from the first conveyor belt only when said tray or said tray-like washware is in a state placed on edge and is oriented parallel to the transport direction. According to the invention, this transport apparatus has one or more essentially vertically extending introduction aids which prevent the situation where, when the first conveyor belt is being loaded with a tray or tray-like washware transversely to its transport direction, this tray or tray-like washware may slip onto the second conveyor belt. The term "width of the conveyor belt" used herein is to be understood as meaning the horizontal extent of the conveyor belt transversely, that is to say perpendicularly to the transport direction.

Since, in the conveyor warewasher according to the invention for trays or tray-like articles, a separate conveyor belt (first conveyor belt) is provided, into which trays or tray-like articles can be placed in a state placed on edge and so as to be oriented parallel to the transport direction, it is possible to clean the trays or tray-like articles simultaneously with other washware, without the risk that the trays or tray-like articles, when being cleaned, throw a spray shadow onto the washware to be cleaned at the same time as the trays or tray-like articles.

Furthermore, the orientation of the trays or tray-like articles parallel to the direction of run of the first and second conveyor belt necessitates a minimal use of the area of the overall belt surface. This minimal use of area means that the second conveyor belt, which is provided for the other washware, can still be used virtually without any restrictions. Both racks of glasses and GN containers can be placed onto the second conveyor belt next to a tray put in place on the first conveyor belt.

The arrangement of two conveyor belts therefore shortens the overall washing and rinsing process in a commercial ware washing kitchen and therefore constitutes a shortening of the work time of the washing personnel and, on the other hand, a reduction in the consumption of resources by the conveyor warewasher.

In a preferred implementation of the transport apparatus, there is provision whereby the transport speed of the first conveyor belt is increased, as compared with the transport speed of the second conveyor belt. This increase in the transport speed makes it possible to place each tray in, without delay, at the moment when all the crockery and cutlery articles are removed from the tray. It is therefore possible that, after the removal of the crockery and cutlery articles possibly present on the tray, the trays are not deposited on a stack, but instead are placed directly into the first conveyor belt. In this embodiment, a second work step with the respective tray is consequently dispensed with. Automatic tray de-stacking at the machine outgoing region is likewise preferred for this machine configuration, since, because cleaning processes take place in parallel on both conveyor belts, the operating personnel at the machine outgoing region may sometimes be overtaxed by the unloading of the conveyor warewasher.

The concept of providing a separate conveyor belt for specific types of washware can be extended, as desired, and various combinations of individual conveyor belts are possible. Thus, in a preferred implementation of the transport apparatus there is provision whereby, furthermore, at least one further conveyor belt running parallel to the first and second conveyor belt is used, this further conveyor belt preferably being provided for cutlery articles. In this case, it is preferable if the further conveyor belt provided for cutlery articles runs directly next to the first conveyor belt and between the first and second conveyor belt. In this implementation, it is no longer necessary for the operator of the conveyor warewasher to remove the cutlery batch from the respective tray manually at the machine inlet. Since the trays are placed on edge for feeding them and for placing them onto the first conveyor belt, the cutlery batch falls automatically, due to gravity, from the erected tray into the cutlery track (further conveyor belt) and likewise, after washing and drying, into a container provided. The manipulations needed for the cutlery are therefore dispensed with completely.

Moreover, special tracks for individual types of washware, such as, for example plates and/or dishes, may be provided, since automatic de-stacking systems are already known for all these types of washware from the technology of partly and fully automatic machinery. As a result of the degree of automation which is increased as a result of these special tracks, in conjunction with automatic de-stacking, work time can be saved both on the clean and on the dirty side of the conveyor warewasher. The rinsing process therefore proceeds more efficiently and its overall time is shortened, so that, in addition to work time, resources can also be saved.

The above object is achieved, furthermore, by means of a combination of the above-described conveying apparatus and of the above-described conveyor warewasher.

As a result of automatic tray clocking-in and of preferred automatic tray de-stacking, the trays are cleaned without having been touched by the washing personnel. By the trays being oriented parallel to the direction of run of the main conveyor belt, only a minimal width of the inner space is required. This means that the main conveyor belt can still be used virtually without any restrictions. Both racks of glasses and GN containers can be placed onto the main conveyor belt next to a tray in the tray track or tray conveyor belt. The arrangement of two conveyor belts thus shortens the overall washing and rinsing process in a commercial ware washing kitchen and thus constitutes, on the one hand, a shortening of the work time of the washing personnel and also a reduction in the consumption of resources by the warewasher.

A separate cutlery track is possible as an extension to the tray track described. This cutlery track runs parallel to and directly next to the tray track. The automatic cutlery feed into the cutlery track running parallel is an extension of the automatic tray placing-in apparatus. The cutlery batch falls automatically, due to gravity, from the erected tray into the cutlery track and likewise, after washing and drying, into a container provided. The manipulations also needed for the cutlery would therefore be dispensed with completely.

The orientation of the conveying system and conveyor belt in parallel according to the invention in this case enables the operating personnel to have a work position which, on the one hand, ensures easy manual unloading of the conveying system, while at the same time this operation is largely automated. This is because, in both cases, the washware is unloaded transversely to the conveying direction of the conveying system, and therefore the operating personnel do not have to change over to a conveying direction of the washware which is governed by the automated unloading operation and which runs, for example, transversely to the transport direction. The parallel routing at the same time enables the space for the manual and automated unloading operation to be decluttered, with the result that the operating personnel can go about their activity, as usual, without being obstructed by the automatic unloading station. It is, of course, possible to design the conveying apparatus as an independent mobile appliance which can be assigned selectively to one or the other conveyor belt of different conveyor warewashers, so that it can be used in an extremely flexible way.

The method according to the invention also achieves the above object, since it is directed at the same parallel orientation of the conveying apparatus and conveyor belt.

Preferably, the above-described conveying apparatus is to be used for unloading or clocking in/placing in trays or tray-like washware, if required also together with the cutlery lying on them.

The invention is described below, with reference to the drawings by means of various embodiments as example. In this case, identical or functionally identical parts are given the same reference numerals.

FIGS. 1 to 4 are intended to explain backgrounds of the present invention which serve for a better understanding of the invention shown in FIGS. 5 to 11. In the figures:

FIG. 1 shows a diagrammatic longitudinal view of a conveyor warewasher, in which a transport apparatus can be used for the simultaneous treatment (cleaning and drying) of a plurality of types of washware arranged next to one another;

FIG. 2b shows a cross-sectional view of the transport apparatus according to FIG. 2a;

FIG. 3b shows a cross-sectional view of the transport apparatus according to FIG. 3a;

FIG. 4b shows a cross-sectional view of the transport apparatus according to FIG. 4a;

FIG. 5b shows a top view of the combination according to FIG. 5a;

FIG. 8b shows a partially sectional longitudinal view of the combination of a conveying apparatus and of a flight-type warewasher of FIG. 8a;

FIG. 9b shows a further perspective view of the warewasher-side end region of the conveying apparatus according to FIG. 9a;

FIG. 10 shows a top view of the warewasher-side end region of the conveying apparatus according to FIG. 9a; and FIG. 11 shows a side view of the warewasher-side end region of the conveying apparatus according to FIG. 9a.

Figure 1:
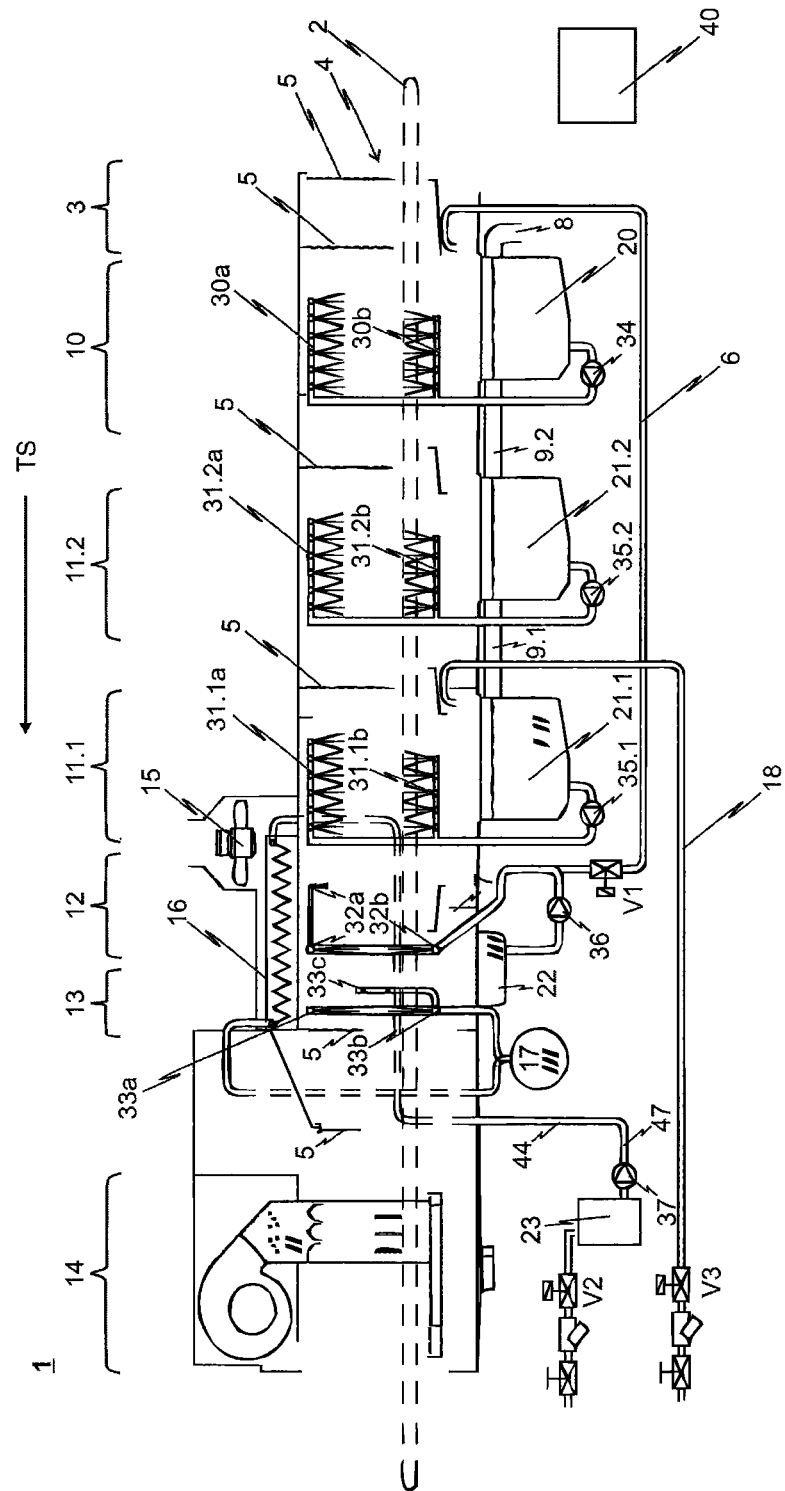

FIG. 1 shows a diagrammatic longitudinal view of an exemplary embodiment of a conveyor warewasher 1 in which a transport apparatus 2 is used for transporting washware, not illustrated in FIG. 1, in a transport direction TS through the conveyor warewasher 1. As is subsequently described in more detail with reference to the illustrations in FIGS. 2 to 4, the transport apparatus 2 is designed for the simultaneous treatment (cleaning and drying) of a plurality of types of washware arranged next to one another, in order thereby to configure the overall washing and rinsing process more efficiently, as a result of which, in particular, the work time of the washing personnel can be shortened and the consumption of resources by the warewasher can be reduced.

As may be gathered from the illustration in FIG. 1, the conveyor warewasher 1 according to the exemplary embodiment has at least one washing zone, for example as illustrated in FIG. 1, a pre-washing zone 10 and two main washing zones 11.1, 11.2 which are arranged downstream of the pre-washing zone 10, as seen in the transport direction TS.

An afterwash zone 12 is arranged downstream of the at least one washing zone 10, 11.1, 11.2, as seen in the transport direction TS, and, downstream of the afterwash zone 12, there is arranged at least one final rinse zone, for example, as illustrated, only a single final rinse zone 13.

In the conveyor warewasher 1 illustrated in FIG. 1, the final rinse zone 13 is followed in the transport direction TS of the washware by a drying zone 14.

The respective zones 10, 11.1, 11.2, 12, 13, 14 of the conveyor warewasher 1 may be separated from one another via parting curtains 5. In the embodiment illustrated in FIG. 1, the incoming tunnel 3 of the conveyor warewasher 1 is itself also separated from the incoming region 4 via a parting curtain 5. By the parting curtains 5 being provided, washing liquid and final rinse liquid are prevented from splashing over and vapors are prevented from escaping out of the conveyor warewasher 1.

Said treatment zones 10, 11.1, 11.2, 12, 13 of the conveyor warewasher 1 are assigned spray nozzles 30a, 30b, 31.1a, 31.1b, 31.2a, 31.2b, 32a, 32b, 33a, 33b and 33c. These spray nozzles 30a, 30b, 31.1a, 31.1b, 31.2a, 31.2b, 32a, 32b, 33a, 33b and 33c serve for spraying liquid onto the washware to be treated when this is transported through the respective treatment zones 10, 11.1, 11.2, 12, 13 by the transport apparatus 2. The individual spray systems from the treatment zones 10, 11.1, 11.2, 12, 13 ensure that the washware to be treated is sprayed down both from the top side and from the underside.

In the conveyor warewasher 1 illustrated diagrammatically in FIG. 1, however, the final rinse zone 13 has not only downwardly directed upper final rinse nozzles 33a and upwardly directed lower final rinse nozzles 33b, but also transversely directed lateral final rinse nozzles 33c on each side of the transport apparatus 2. The use of lateral final rinse nozzles 33c makes it possible to spray the washware surfaces (crockery surfaces) with final rinse liquid in a directed manner even in shadow zones. It is precisely when the transport system is fully loaded, for example, when the crockery carrier is loaded plate on plate, that the use of lateral final rinse nozzles 33c in the final rinse zone 13 has a distinct advantage in terms of the final rinsing result (effective washing off of cleaning agent residues on crockery surfaces even in shadow zones), as compared with systems in which only upper and lower final rinse nozzles 33a, 33b are provided in the final rinse zone 13, but no transversely directed lateral final rinse nozzles 33c.

The afterwash or pre-final rinse zone 12, main washing zones 11.1, 11.2, and pre-washing zone 10 are, furthermore, assigned tanks (afterwash tank 22, main washing tank 21.1, 21.2, pre-washing tank 20) for receiving sprayed liquid and/or for providing liquid for the spray nozzles 30a, 30b, 31.1*a*, 31.1*b*, 31.2*a*, 31.2*b*, 32*a*, 32*b* of the respective treatment zones 10, 11.1, 11.2, 12.

As already indicated, in the conveyor warewasher 1 illustrated in FIG. 1, final rinse liquid, which is composed of freshwater with administered rinse aid, is sprayed onto the washware (not illustrated) via the final rinse nozzles 33*a*, 33*b*, 33*c* arranged above and below the transport apparatus 2 and laterally. Part of the sprayed final rinse liquid is transported via a cascade system, opposite to the transport direction TS of the washware from treatment zone to treatment zone. The remaining part of the final rinse liquid sprayed in the final rinse zone 13 is conducted directly via a valve V1 and a bypass line 6 into the pre-washing tank 20 assigned to the pre-washing zone 10.

In the cascade system, the final rinse liquid sprayed by the final rinse nozzles 33*a*, 33*b*, 33*c* flows as a result of gravity from the final rinse zone 13 into the afterwash tank 22 assigned to the afterwash zone 12. The final rinse liquid captured by the afterwash tank 22 and sprayed in the final rinse zone 13 is subsequently conveyed with the aid of an afterwash pump 36 to the spray nozzles of the afterwash zone (upper and lower afterwash nozzles 32*a*, 32*b*).

In the afterwash zone 12, washing liquid is washed off from the washware. The liquid (afterwash liquid) which in this case occurs flows as a result of gravity into the main washing tank 21.1 assigned to the first main washing zone 11.1. Preferably, for this purpose, a run-off element 7, for example, a run-off bottom or guide plate, is provided, which conducts the afterwash liquid sprayed by the afterwash nozzles 32*a*, 32*b* into the main washing tank 21.1. According to another embodiment (not illustrated) of the conveyor warewasher 1, the run-off element 7 may be dispensed with if the main washing tank 21.1 extends underneath the afterwash nozzles 32*a*, 32*b* of the afterwash zone 12.

The liquid received by the main washing tank 21.1 of the first main washing zone 11.1 is usually provided with a cleaning agent (detergent) and sprayed onto the washware with the aid of a first main washing pump 35.1 by the spray nozzles of the first main washing zone 11.1 (upper and lower main washing nozzles 31.1*a*, 31.1*b*). The washing liquid sprayed by the main washing nozzles 31.1*a*, 31.1*b* subsequently flows as a result of gravity back into the main washing tank 21.1.

The main washing tank 21.1 is fluid-connected via an overflow line 9.1 to the main washing tank 21.2 assigned to the second main washing zone 11.2. The washing liquid sprayed in the first main washing zone 11.1 passes via this overflow line 9.1 into the main washing tank 21.2 of the second main washing zone 11.2 if a sufficient quantity of washing liquid is received in the main washing tank 21.1 of the first main washing zone 11.1.

The liquid received by the main washing tank 21.2 of the second main washing zone 11.2 is sprayed onto the washware with the aid of a second main washing pump 35.2 via the spray nozzles of the second main washing zone 11.2 (upper and lower main washing nozzles 31.2*a*, 31.2*b*). The washing liquid sprayed by the main washing nozzles 31.2*a*, 31.2*b* subsequently flows as a result of gravity back into the main washing tank 21.2 of the second main washing zone 11.2.

The main washing tank 21.2 of the second main washing zone 11.2 is fluid-connected via an overflow line 9.2 to the pre-washing tank 20 assigned to the pre-washing zone 10. The washing liquid sprayed in the second main washing zone 11.2 passes via this overflow line 9.2 into the pre-washing tank 20 if a sufficient quantity of washing liquid is received in the main washing tank 21.2 of the second main washing zone 11.2.

The liquid received in the pre-washing tank 20 of the pre-washing zone 10 is subsequently sprayed onto the washware with the aid of a pre-washing pump 34 via the spray nozzles of the pre-washing zone 10 (upper and lower pre-washing nozzles 30*a*, 30*b*), in order to remove coarse impurities from the washware. The washing liquid sprayed by the pre-washing nozzles 30*a*, 30*b* subsequently flows as a result of gravity back into the pre-washing tank 20.

The pre-washing tank 20 is provided with an overflow line 8 which serves, when a specific liquid level in the pre-washing tank 20 is overshot, for feeding the excess quantity of liquid to a sewage system.

As already indicated, the liquid sprayed in the main washing zones 11.1, 11.2 and in the pre-washing zone 10 preferably contains cleaning agent (detergent) which, for example, is administered with the aid of a cleaning agent administering device (not shown in the drawings) to the liquid received in the main washing tank 21.1 of the first main washing zone 11.1.

As already mentioned, the final rinse zone 13 is followed in the transport direction TS by the drying zone 14. In the drying zone 14, the washware is dried by means of dry and heated air, in order to blow off or dry off the moisture located on the washware. In order to keep the moisture content of the air within a range beneficial for drying, it is conceivable, for example, to feed ambient air from outside to the drying zone 14, via a port, for example through the outlet port for the washware.

The warm and moist air in the drying zone 14 is subsequently drawn off from the drying zone 14 via a further port, for example with the aid of a blower 15. In this case, it is advantageous if the exhaust air stream from the drying zone 14 passes a device 16 for heat recovery, in which, for example, a condenser may be provided. The device 16 for heat recovery serves for recovering at least part of the heat energy contained in the exhaust air. This recovered heat energy may be used, for example, for heating the liquid to be sprayed in the final rinse zone 13.

If, before a first start of the conveyor warewasher 1, the tanks (pre-washing tank 20, main washing tanks 21.1, 21.2, afterwash tank 22) assigned to the treatment zones 10, 11.1, 11.2, 12 are empty or only insufficiently filled, they first have to be filled via a freshwater line 18 and/or by spraying final rinse liquid in the final rinse zone 13. The freshwater line 18 is connectable to a freshwater supply network via an activatable valve V3. The quantity of washing liquid available in the main washing zones 11.1, 11.2, and in the pre-washing zone 10 can in each case be monitored with the aid of a level sensor provided in the main washing tank 21.1, 21.2 of the first and/or second main washing zone 11.1, 11.2 or with the aid of a level sensor provided in the pre-washing tank 20 and be communicated to a control device 40.

As illustrated in FIG. 1, the final rinse zone 13 may be assigned a freshwater container 23 for the intermediate storage of at least part of the freshwater provided for final rinsing. The freshwater container 23, on the one hand, is provided with a freshwater connection which is connectable to a freshwater supply network via an activatable freshwater supply valve V2. On the other hand, the freshwater container 23 is connected to the suction side of a final rinse pump 37.

The delivery side of the final rinse pump 37 is connected to the upstream end region 47 of a main line system 44, via which, when the final rinse pump 37 is actuated, freshwater is conveyed out of the freshwater container 23 to the final rinse nozzles 33a, 33b, 33c. In particular, the main line system 44 connects the delivery side of the final rinse pump 37 to a water heater 17 (boiler). In this case, the main line system 44 is designed in such a way that the liquid supplied to the final rinse nozzles 33a, 33b, 33c by the final rinse pump 37 passes first the device 16 for heat recovery before it reaches the water heater 17. It is thereby possible to utilize at least part of the thermal energy of the exhaust air discharged from the drying zone 14 for heating the liquid supplied via the main line system 44 to the spray nozzles 33a, 33b, 33c.

Different embodiments of transport apparatuses 2 for transporting washware through the conveyor warewasher 1 illustrated diagrammatically in FIG. 1 are described below with reference to the illustrations in FIGS. 2a to 4b.

Figure 2A:
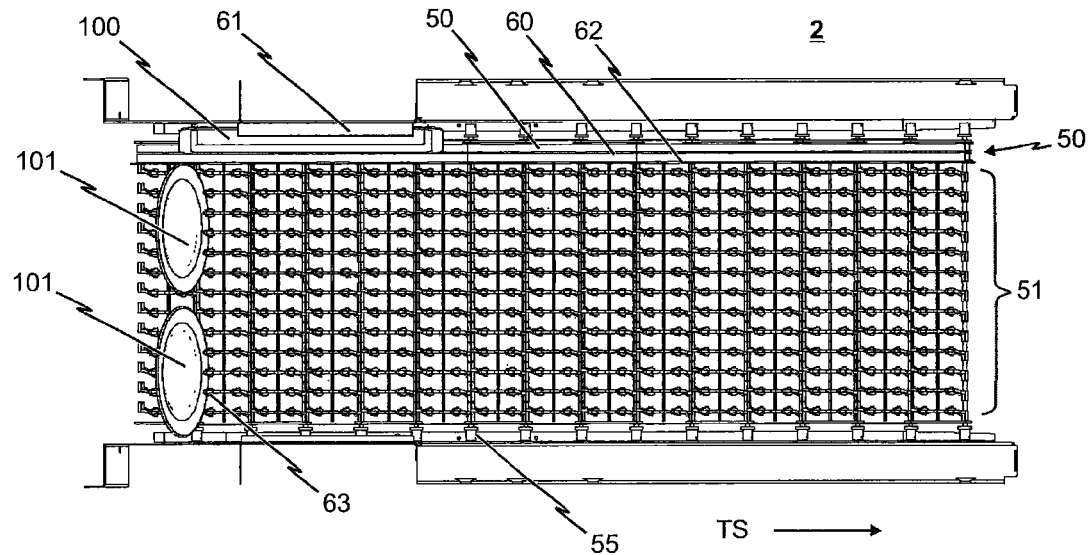
FIG. 2a shows a top view of a subregion of a first exemplary embodiment of a transport apparatus which can be used in a conveyor warewasher according to FIG. 1.
Figure 2B:
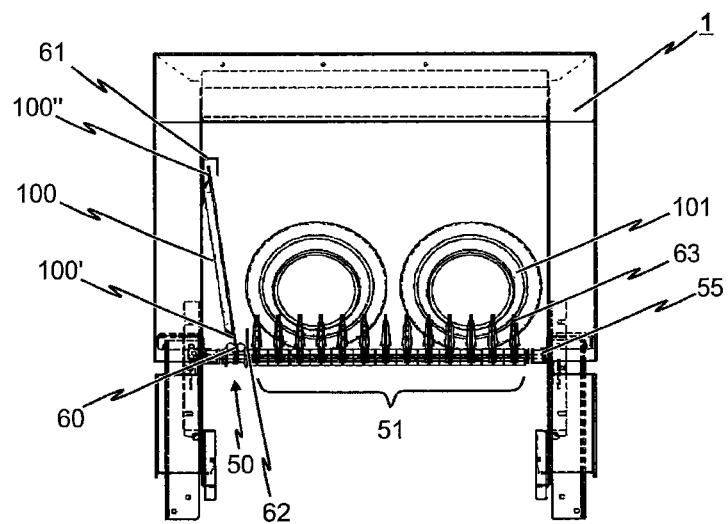

In particular, FIGS. 2a and 2b show diagrammatically a region of a first exemplary embodiment of a transport apparatus 2 which is suitable for use in a conveyor warewasher 1 according to the illustration in FIG. 1. In this case, FIG. 2a shows a top view of the machine outgoing-side region of the transport apparatus 2, while the corresponding cross-sectional view is illustrated in FIG. 2b.

Accordingly, the transport apparatus 2 illustrated in FIGS. 2a and 2b has a first conveyor belt 50 for trays or tray-like washware 100 and a second conveyor belt 51, running parallel to the first conveyor belt 50, for other washware, in particular plates 101, dishes 102 and/or cutlery 103. The first conveyor belt 50 is designed to be relatively narrow in comparison with the second conveyor belt 51 so that a tray or tray-like washware 100 can be received by the first conveyor belt 50 solely in a state placed on edge and so as to be oriented parallel to the transport direction TS. The orientation of the washware 100, to be received by the first conveyor belt 50, parallel to the direction of run of the first conveyor belt 50 necessitates a minimal use of area of the overall belt surface. In other words, the first conveyor belt 50 has a width reduced in such a way that only a minimal area of the overall belt surface is occupied by the first conveyor belt 50, thus making it possible to place in trays or tray-like washware 100 precisely when this washware 100 is in a state placed on edge and is oriented parallel to the transport direction TS.

This makes it possible for the second conveyor belt 51 to have, as before, a sufficient width so that it can still be used, virtually without any restrictions, for the transport of other washware, in particular plates 101, dishes 102 and/or cutlery 103, through the individual treatment zones of the conveyor warewasher 1. Thus, as before, for example, even racks of glasses or GN containers can be placed onto the second conveyor belt 51 next to the tray or tray-like washware 100 received on the first conveyor belt 50.

Merely as an example, in the embodiment illustrated in FIGS. 2a and 2b, a tray 100 and two plates 101 are arranged next to one another, the tray 100 being placed onto the first conveyor belt 50 of the transport apparatus 2 and the plates 101 being placed on the second conveyor belt 51 of the transport apparatus 2. In this embodiment, the plates 101 are held on the second conveyor belt 51 with the aid of compartments, these compartments being formed by supporting fingers 63 provided on the second conveyor belt 51.

As indicated already, despite the provision of a first conveyor belt 50 running parallel to the second conveyor belt 51, the second conveyor belt 51 has a sufficient width also to be able to receive conventional racks of glasses, etc. This is achieved, without the conveyor warewasher 1 needing to have a transport apparatus 2 which is made wider overall.

It is thereby possible that both trays or tray-like washware 100 and other washware, in particular plates 101, dishes 102 and/or cutlery 103, can be cleaned simultaneously. Consequently, cleaning processes taking place in parallel can be carried out on both conveyor belts 50, 51, thus ultimately shortening the overall washing and rinsing process in a commercial ware washing kitchen. This, in turn, shortens the work time of the washing personnel and leads to a reduction in the consumption of resources by the conveyor warewasher 1.

As may be gathered particularly from the illustration in FIG. 2b, in the exemplary embodiment of the transport apparatus 2 the first conveyor belt 50 is designed to receive trays or tray-like washware 100, this washware being supported on the first conveyor belt surface via a marginal or edge region 100'. To hold securely the tray-like washware 100 received on the first conveyor belt 50 and placed on edge, it is advantageous in particular if a guide assigned to the first conveyor belt 50 is provided. This guide preferably serves not only for holding the washware 100 on the first conveyor belt 50 but also for guiding the washware 100 received on the first conveyor belt 50, when it is being transported through the respective treatment zones of the conveyor warewasher 1.

In the embodiment of the transport apparatus 2 illustrated in FIGS. 2a and 2b, a guide of this type is implemented in the form of a lower guide groove, on the one hand, and in the form of an upper guide rail, on the other hand. In particular, it may be gathered from the illustration in FIG. 2b that a guide groove 60 formed in the first conveyor belt 50 and running in the longitudinal direction of the first conveyor belt 50 is designed for guiding and holding the tray-like washware 100 received on the first conveyor belt 50. This guide groove 60 serves for receiving a marginal or edge region 100' of a tray or tray-like washware 100 placed onto the first conveyor belt 50.

In addition to the (lower) guide groove 60, in the embodiment illustrated in FIGS. 2a and 2b, an upper guide element 61 lying opposite the first conveyor belt 50 is used, which is implemented here as a guide rail. As indicated in FIG. 2b, this guide element 61 is designed to receive a region 100" of a tray or tray-like washware 100 placed onto the first conveyor belt 50 and for guiding the washware 100 during transport through the individual treatment zones of the conveyor warewasher 1. It is clear that, by the lower guide groove 60 and the upper guide element 61 being provided, the washware 100 placed on edge onto the first conveyor belt is held securely on the first conveyor belt 50.

As may be gathered from the illustration in FIG. 2b, the upper guide element 61 is preferably designed to receive a region 100" of the tray or tray-like washware 100 placed onto the first conveyor belt 50, which region lies opposite the marginal or edge region 100' via which the tray or tray-like washware 100 is supported on the first conveyor belt 50.

To achieve a situation where trays or tray-like washware having different dimensions can be received on the first conveyor belt 50, it is advantageous if the upper guide element 61 is adjustable in the vertical direction. Thus, in a way which is simple to implement, the upper guide element 61 can be adapted to the height of a tray or tray-like washware 100 to be received by the first conveyor belt 50 and placed on edge. Accordingly, the first conveyor belt 50 is suitable, on the one hand, for receiving trays 100 which are supported on the first conveyor belt 50 via their longitudinal side edge and, on the other hand, for receiving trays 100 which are supported on the first conveyor belt 50 via their transverse side edge. The first conveyor belt 50 can thus be used flexibly for different applications.

In particular, it may be gathered from the illustration in FIG. 2b that, in the exemplary embodiment shown diagrammatically there, of the transport apparatus 2, a strap guide 62 assigned to the first conveyor belt 50 is provided. A strap guide 62 of this type is advantageous, particularly when, as in the embodiment illustrated in FIGS. 2a and 2b, the first conveyor belt 50 is designed as an endless drive strap. By a strap guide 62 of this type being provided, it can be ensured in a way that is simple to implement, but effective, that the first conveyor belt 50 always runs parallel to the second conveyor belt 51. Furthermore, it has proved advantageous if the first conveyor belt 50 is designed as a flat, vee, toothed or round strap in order to provide additional guidance for the first conveyor belt 50.

As indicated in FIG. 2b, the strap guide 62 assigned to the first conveyor belt 50 may, for example, be fastened to belt rod axles 55 of the second conveyor belt 51, with the result that a compact set-up of the transport apparatus 2 is achieved. However, other embodiments for fastening the strap guide 62 may, of course, also be considered.

As already stated, in the embodiment illustrated in FIGS. 2a and 2b, a guide groove 60 formed in the first conveyor belt 50 and running in the longitudinal direction of the first conveyor belt 50 is provided, in which a marginal or edge region 100' of a tray or tray-like washware 100 placed onto the first conveyor belt 50 can be received, in order to guide the washware 100, placed on edge onto the first conveyor belt 50, during transport through the respective treatment zones of the conveyor warewasher 1. Instead of a guide groove 60 of this type, however, it is also conceivable if the strap guide 62 is employed in order to guide not only the first conveyor belt 50, but also the washware 100 placed onto the first conveyor belt 50 during transport through the respective treatment zones of the conveyor warewasher 1. If, as illustrated in FIG. 2b, the strap guide 62 is designed as a vertically oriented guide surface, this vertically oriented guide surface may at the same time also serve as an abutment surface for a marginal or edge region 100' of a tray or tray-like washware 100 received on the first conveyor belt 50 and placed on edge. Although not illustrated in the drawings, it is thus conceivable that the marginal or edge region 100' of the tray or tray-like washware 100 received on the first conveyor belt 50 and placed on edge is supported on the vertically oriented guide surface of the strap guide 62, thus making it possible to guide the washware 100 received on the first conveyor belt 50 through the respective treatment zones of the conveyor warewasher 1.

In one possible embodiment, the upper guide element 61 is designed as a guide rail. This guide rail preferably runs in such a way that in the outgoing region of the conveyor warewasher 1, that is to say downstream of the at least one final rinse zone 13, as seen in the transport direction TS, a tray or tray-like washware 100 received on the first conveyor belt 50 is transferred from its state placed on edge into its horizontally oriented normal state and is subsequently de-stacked. In this embodiment, therefore, the tray or tray-like washware 100 received originally on the first conveyor belt 50 is automatically de-stacked at the machine outgoing region, thus allowing a further reduction in operating personnel at the machine outgoing region.

Basically, it is preferable if the first conveyor belt 50, which is provided for the transport of trays or tray-like washware 100, has an increased transport speed, as compared with the second conveyor belt 51 which is provided for other washware. The increase in transport speed enables the trays or tray-like washware 100 to be placed in without delay, at the moment when all the cutlery and crockery articles are removed from the tray. Thus, after the crockery and cutlery articles are removed, the trays 100 are not deposited on a stack, but instead placed directly into the first conveyor belt 50. A second work step with the respective tray 100 is consequently dispensed with.

In a preferred implementation of the last-mentioned embodiment, there is provision whereby, for the first and the second conveyor belt 50, 51, a common drive device is provided, via which the first and the second conveyor belt 50, are driven jointly. By a common drive device being provided, the overall set-up of the conveyor warewasher is simplified.

In the case of a common drive device for the first and the second conveyor belt 50, 51, so that different transport speeds can be brought about, it is conceivable that the first conveyor belt 50 is connected to the common drive device via a first driveshaft assigned to the first conveyor belt 50 and via a first gear device assigned to the first conveyor belt 50, while the second conveyor belt 51 is connected to the common drive device via a second driveshaft assigned to the second conveyor belt 51 and via a second gear device assigned to the second conveyor belt 51. Preferably, the respective step-up ratio of the first and of the second gear device is selected in such a way that the transport speed at which washware 100 received by the first conveyor belt 50 is transported through the respective treatment zones of the conveyor warewasher 1 is higher than the transport speed at which washware 101, 102, 103 received by the second conveyor belt 51 is transported through the respective treatment zones of the conveyor warewasher 1.

Alternatively to this, however, it is, of course also possible to provide for each conveyor belt 50, 51, an assigned drive device for driving the corresponding conveyor belt 50, 51 in such a way that washware received by the respective conveyor belt 50, 51 is transported through the respective treatment zones of the conveyor warewasher 1 at a transport speed set or settable individually for the respective conveyor belt 50, 51.

A further embodiment of the transport apparatus is described below with reference to the illustrations in FIGS. 3a and 3b. In particular, these figures show diagrammatically the machine outgoing-side region of a second exemplary embodiment of the transport apparatus 2 which is suitable for use in a conveyor warewasher 1 according to the illustration in FIG. 1.

Figure 3A:
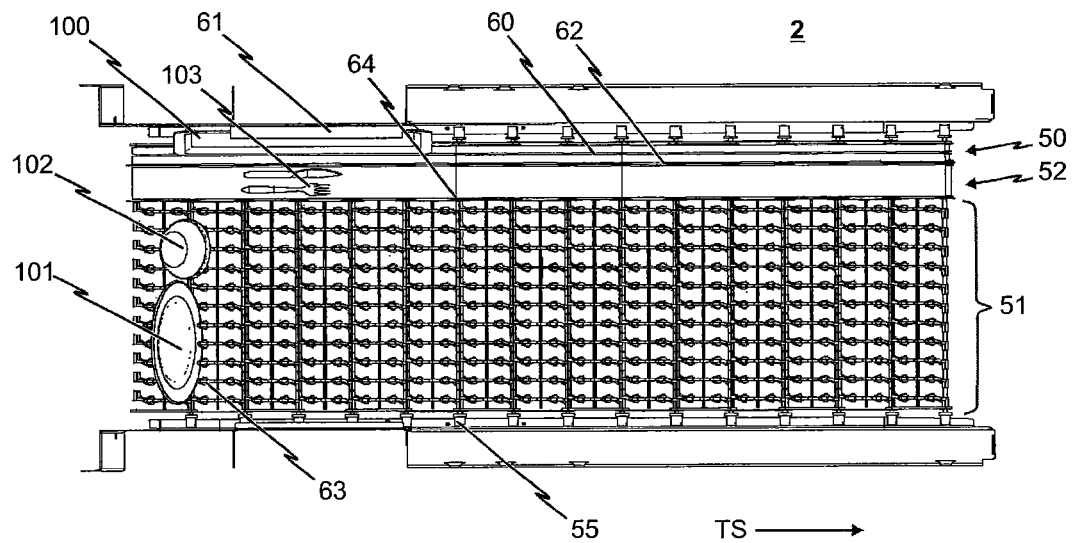
FIG. 3a shows a top view of a subregion of a second exemplary embodiment of a transport apparatus which can be used in a conveyor warewasher according to FIG. 1.
Figure 3B:
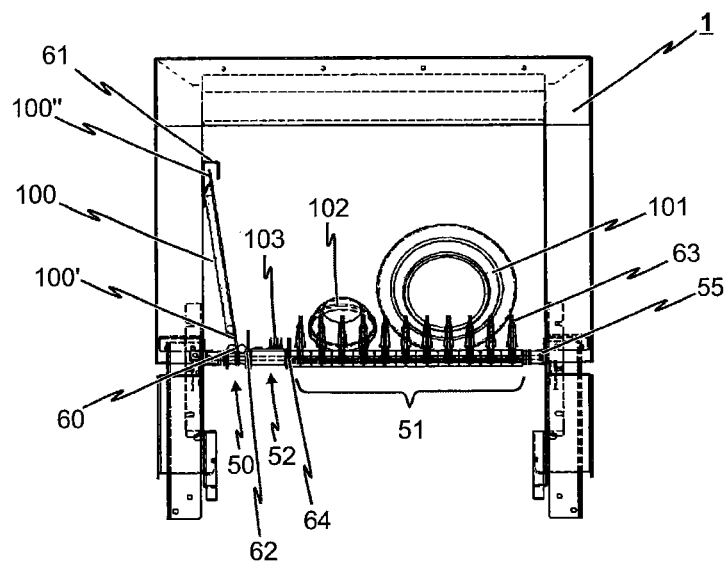

The embodiment, illustrated in FIGS. 3a and 3b, of the transport apparatus 2 differs from the embodiment described above with reference to the illustrations in FIGS. 2a and 2b in that a further conveyor belt 52 is provided in addition to the first and second conveyor belts 50, 51. In the embodiment illustrated in FIGS. 3a and 3b, this further conveyor belt 52 runs parallel to the first and the second conveyor belt 50, 51 and serves for receiving cutlery or cutlery-like washware 103. In this case, preferably, there is provision whereby the further conveyor belt 52 runs directly next to the first conveyor belt 50 and between the first and second conveyor belts 50, 51.

Like the first conveyor belt 50, the further conveyor belt 52 also has a reduced width, as compared with the overall belt surface and, in particular, as compared with the width of the second conveyor belt 51, in order to ensure a minimal use of the area of the overall belt surface. In other words, despite the provision of the first conveyor belt 50 and of the further conveyor belt 52, the second conveyor belt 51 is suitable, as before, for the reception of, for example, racks of glasses or two washware articles such as, for example, a plate 101 and a dish 102, arranged next to one another.

It is nevertheless preferable if the cutlery 103 received by the further conveyor belt 52, after running through the conveyor warewasher 1, falls into a container provided at the machine outgoing region, thus allowing a further reduction in operating personnel at the machine outgoing region. In particular, this embodiment makes it possible that the manipulations needed for cutlery are dispensed with completely both at the machine incoming region (dirty side of the conveyor warewasher 1) and at the machine outgoing region (clean side of the conveyor warewasher 1).

The concept of the plurality of conveyor belts running parallel can in this sense be extended virtually as desired and various combinations of conveyor belts provided specially for specific types of washware are possible. As a supplement to the above-described transport apparatuses in which up to three conveyor belts 50, 51, 52 running parallel are provided, it is conceivable in particular to provide special transport tracks for plates 101 and dishes 102, since automatic de-stacking systems are already known for these types of washware from the technology of partly automatic and fully automatic machinery.

With a view to a conveyor warewasher 1 operating as efficiently as possible, it is therefore advantageous if, in addition to the first conveyor belt 50 which is designed specially for receiving trays or tray-like washware 100 and in addition to the further conveyor belt 52 which is designed especially for receiving cutlery 103, further conveyor belts or conveyor belt tracks designed with regard to a special type of washware are provided.

Figure 4A:
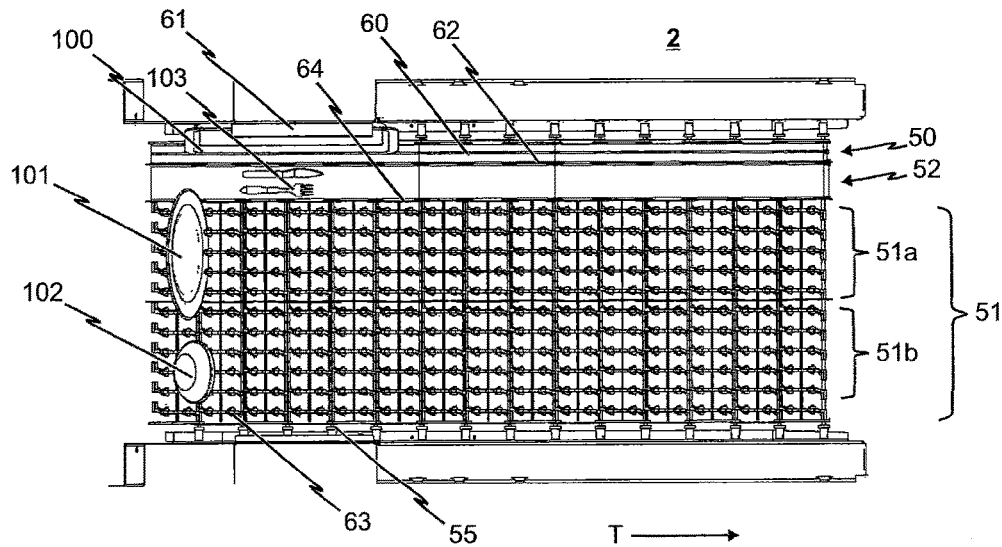
FIG. 4a shows a top view of a subregion of a third exemplary embodiment of a transport apparatus which can be used in a conveyor warewasher according to FIG. 1.
Figure 4B:
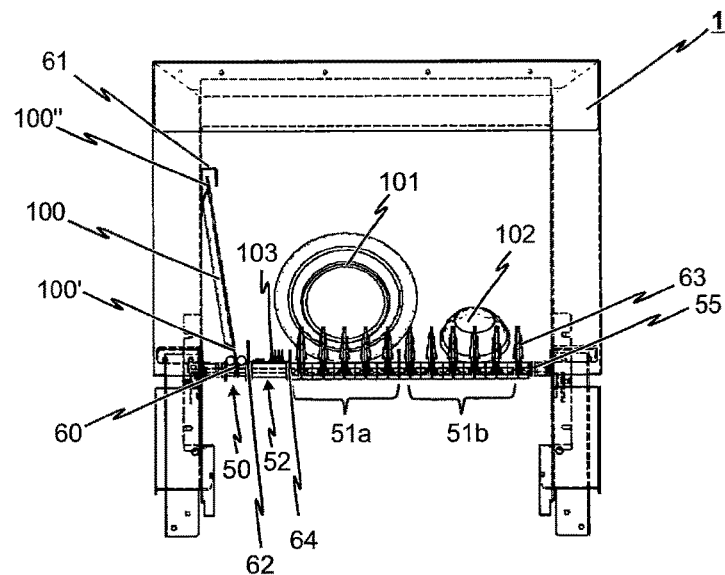

In this context, reference is made to the embodiment illustrated in FIGS. 4a and 4b. The transport apparatus 2, illustrated partially in these figures corresponds essentially to the embodiment described above with reference to the illustration in FIGS. 3a and 3b, although the second conveyor belt 51 has in this case been divided into a transport track for the "plate" type of washware and a further transport track for the "dish" type of washware. In other words, in the embodiment illustrated in FIGS. 4a and 4b, the second conveyor belt 51 is subdivided into two conveyor belts 51a, 51b running parallel. Although not illustrated in the drawings, an automatic stacking and de-stacking device is provided for each conveyor belt 51a, 51b at the machine incoming region (dirty side of the conveyor warewasher 1) and/or at the machine outgoing region (clean side of the conveyor warewasher 1), in order to stack or de-stack plates 101 onto and from the conveyor belt 51a and in order to stack or de-stack dishes 102 onto and from the conveyor belt 51b.

By the second conveyor belt 51 being subdivided into special tracks and by automated stacking and de-stacking, the degree of automation of the conveyor warewasher 1 is increased, so that work time both on the clean side and on the dirty side of the conveyor warewasher 1 can be saved. The washing process therefore proceeds more efficiently and its overall time is shortened, so that in addition to the work time, resources can also be saved.

It is conceivable to provide, for the second conveyor belt 51 and the at least one further conveyor belt 52 or for the conveyor belt 51 subdivided into two conveyor belts 51a, 51b and the at least one further conveyor belt 52, a common drive device, via which the corresponding conveyor belts 51, 51a, 51b, 52 are driven jointly. The transport speed of each conveyor belt 50, 51, 51a, 51b, 52 can preferably be set individually.

It may be gathered from the illustration in FIG. 4b that the respective top sides of the conveyor belts 50, 51a, 51b and 52 of the transport apparatus 2 lie in a common horizontal plane. This makes it possible for washware to be received even over a plurality of conveyor belts 50, 51a, 51b and 52, that is to say by a plurality of conveyor belts 50, 51a, 51b and 52 simultaneously.

Figure 5A:
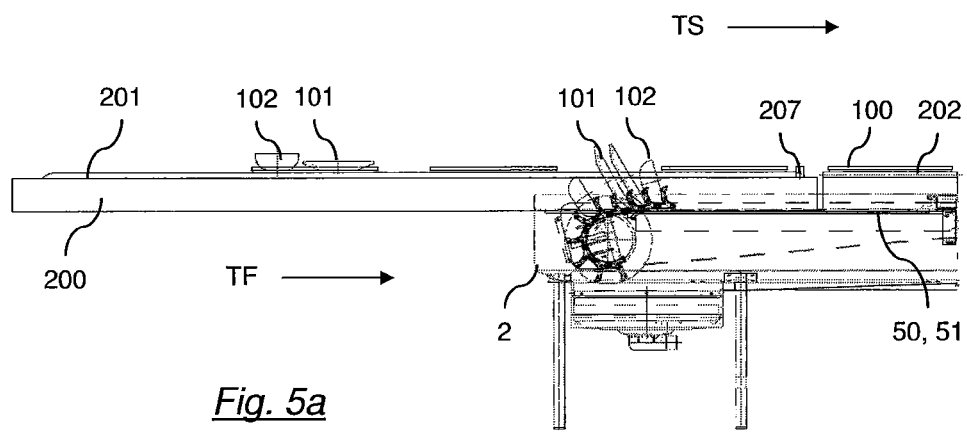
FIG. 5a shows a partially sectional side view of a combination of a conveying apparatus according to the invention and of a flight-type warewasher according to the invention.

FIG. 5a shows a partially sectional side view of a combination of a conveying apparatus 200 according to the invention and of a flight-type warewasher 1 according to the invention. Parallel to its machine incoming region and therefore to its conveyor belt 50, 51 runs a conveying system 201 for the washware which would have to be loaded into the machine 1. The conveying system 201 is designed here, merely by way of example, as a belt conveyor. Delivered plates 101 and dishes 102 are in this case taken manually from the belt conveyor 201 and placed into compartments or supporting fingers of the crockery conveyor belt 51. At the end of the machine incoming region is located an unloading station or clocking-in station 202 for introducing the trays 100 laterally into the tray conveyor belt 50 of the warewasher. The respective conveying or transport direction of the belts 201, 50, 51 is indicated by TF or TS. In this example the feeding of individual trays into the unloading station 202 is controlled with the aid of a clearance switch 207 which can block or clear the path of a tray 100, depending on whether the unloading operation in the station 202 is already concluded or not. The switch 207 may in this case be designed as a mechanical, optical, inductive and/or capacitive switching element.

Figure 5B:
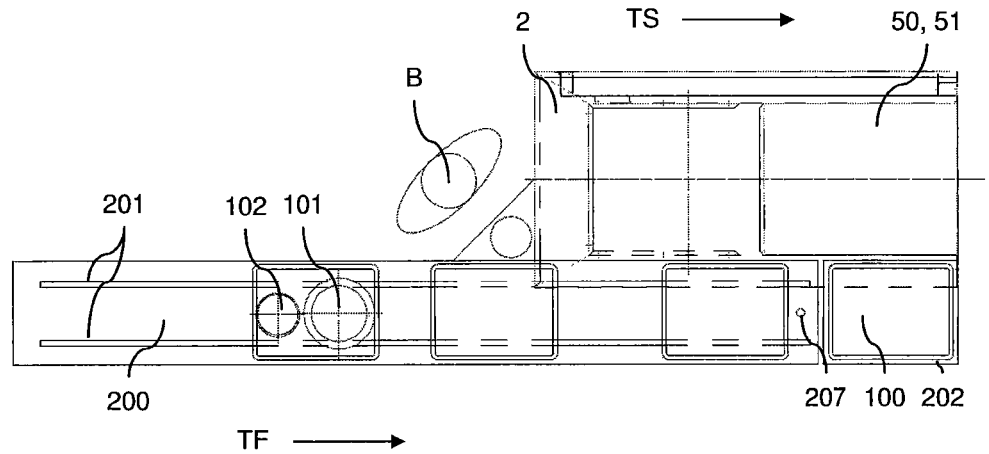

It is clear from the top view of the above combination of the conveying apparatus 200 and of the flight-type warewasher 1 in FIG. 5b how an operator B stands in relation to it when he or she removes the washware manually. By contrast, the trays or tray-like washware 100 continue on their path, possibly also with the cutlery still lying on them. At the unloading station 202, these are then unloaded onto the tray conveyor belt 50 by means of a tipping operation and are fed to the washing operation in the flight-type warewasher 1. In this case, the unloading or placing-in operation is separated spatially from the operator B such that the normal activity of the latter is not obstructed. This would not be possible, for example, if the washware were delivered perpendicularly to the conveying direction TS of the conveyor belt. At the same time, the position, parallel to the conveyor belt 50, 51, of the belt conveyor 201 affords the possibility of providing a plurality of unloading stations 202 working in coordination with one another. For this purpose, too, a corresponding control of the clearance switch 207 may be provided which, for example, may be implemented via an analog electrical circuit, a digital computing unit or a corresponding combination.

Figure 6:
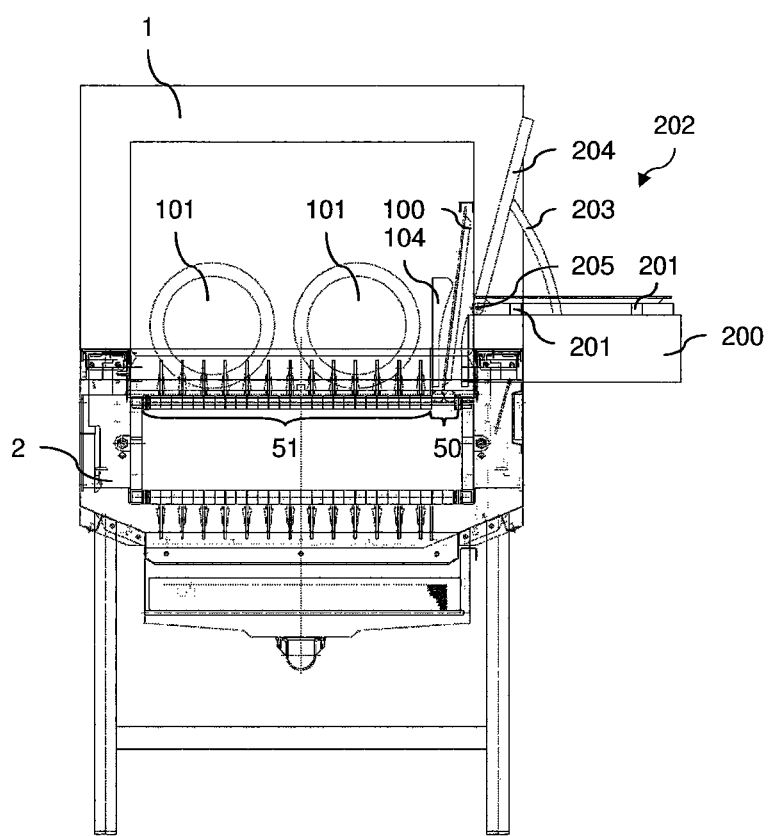
FIG. 6 shows a partially sectional longitudinal view of a combination of a conveying apparatus and of a flight-type warewasher with an unloading station according to a first embodiment.

FIG. 6 shows a partially sectional longitudinal view of a combination of a conveying apparatus 200 according to the invention and a flight-type warewasher 1 according to the invention, with an unloading station 202 according to a first embodiment. In this unloading station 202, the tray 100 is conveyed onto a tipping system 203, by which the tray 100 is erected laterally and then slips as a result of gravity, via introduction aids 104, into a tray track of the conveyor belt which is designed as a tray conveyor belt 50. A tipping plate 204 of the tipping system has in this case a pivot axis 205 and can be moved both pneumatically, hydraulically or electrically. For cutlery 103 as it were falling down with the tray 100, a further conveyor belt 52 may be provided as will be gathered from FIGS. 2 and 3. The operator B therefore does not need to place either the tray 100 or the cutlery 103 manually into the conveyor belt 50, 51, 52 and therefore his work becomes markedly more efficient and simpler.

Figure 7:
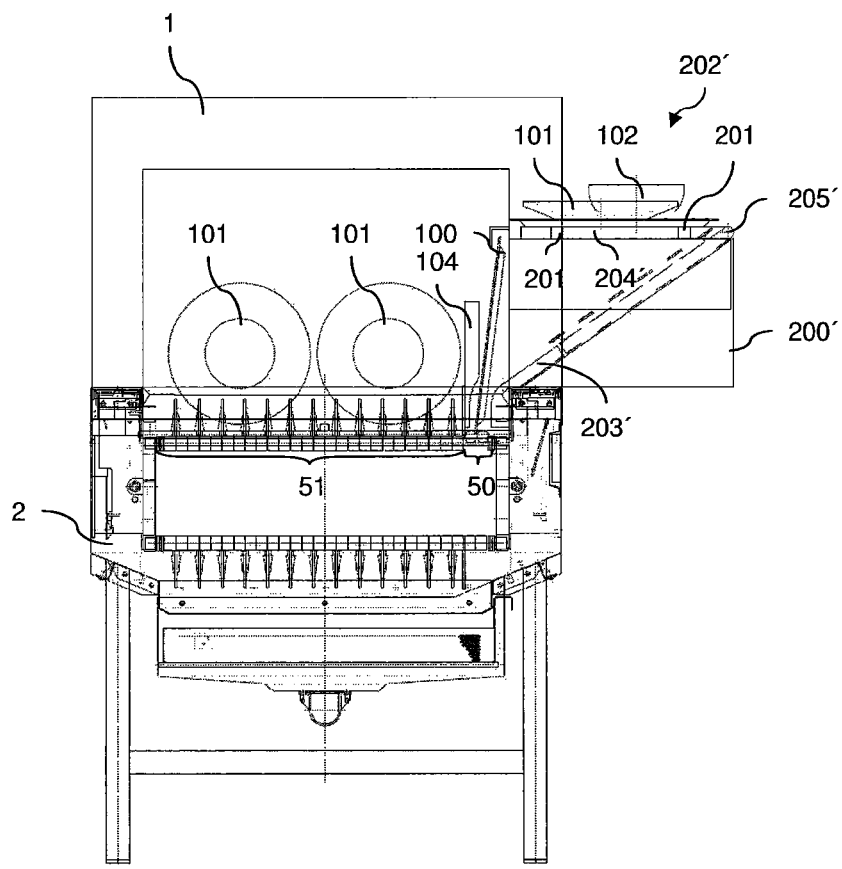
FIG. 7 shows a partially sectional longitudinal view of a combination of a conveying apparatus and of a flight-type warewasher with an unloading station according to a second embodiment.

FIG. 7 shows a partially sectional longitudinal view of a combination of a conveying apparatus 200' according to the invention and of a flight-type warewasher 1 according to the invention, with an unloading station 202' according to a second embodiment. In this embodiment of a tipping system 203' a tipping plate 204' is swung downward via a pivot axis 205' and the tray 100 is introduced into the tray (conveyor belt) 50 or the tray track by gravity and by means of introduction aids 104.

Both of the above-described embodiments of an unloading station 202, 202' can be implemented simply in structural terms, are extremely reliable and efficient and, moreover, are also easy to clean. Of course, a combination of both tipping systems 203, 203', which comes within the knowledge of person skilled in the art, is also possible. Thus, in a modification of the tipping system 203 of FIG. 6, its tipping plate 204 could be capable not only of being swung up, but also down about the same axis of rotation 205, in order to enable the trays 100 to be unloaded on both sides of the conveying apparatus 200, 200'. For example, loading of flight-type warewashers 1 arranged on both sides of the belt conveyor 201 by means of a single conveying apparatus 200, 200' could be considered. However, it would also be conceivable to combine one or more conveying apparatuses 200, 200', in each case with an opposite unloading side, with one another along the cleaning path of the washware 100 . . . 103. In this case, a first unloading station 202, 202' could serve for clocking in trays 100 of a flight-type warewasher 1 arranged, for example, on the left of the conveying apparatus 200, 200', while a further second unloading station 202, 202' arranged at the machine outgoing region of the flight-type warewasher 1 serves for unloading clean trays on the right of the flight-type warewasher 1. Such flexible handling of a conveying apparatus 200, 200' can be assisted in that its unloading station 202, 202' is of modular construction and is configured, for example, rotatably through 180° or so as to be mirror-inverted, so that unloading can be carried out selectively on one side of the conveying apparatus 200, 200' or the other.

Figure 8A:
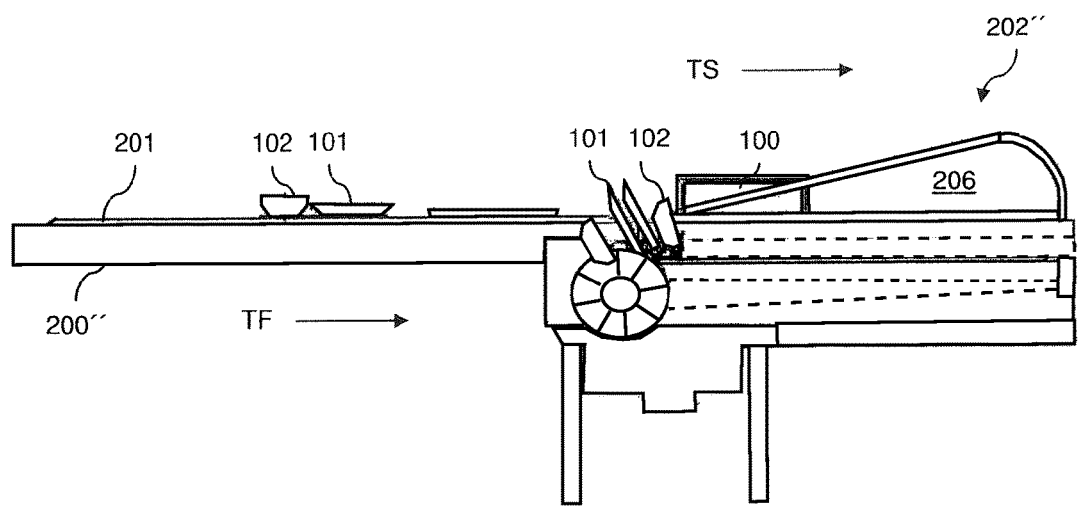
FIG. 8a shows a partially sectional side view of a combination of a conveying apparatus and of a flight-type warewasher with an unloading station according to a third embodiment.

FIG. 8a shows a partially sectional side view of a combination of a conveying apparatus 200" according to the invention and of a flight-type warewasher 1 according to the invention, with an unloading station 202" according to a third embodiment. In this embodiment of automatic tray introduction, the tray is raised on one side by means of conveying straps via a ramp 206. This takes place until the force of gravity has overcome the static friction force and the tray 100 slips laterally into the tray conveyor belt 50 via introduction aids 104.

Figure 8B:
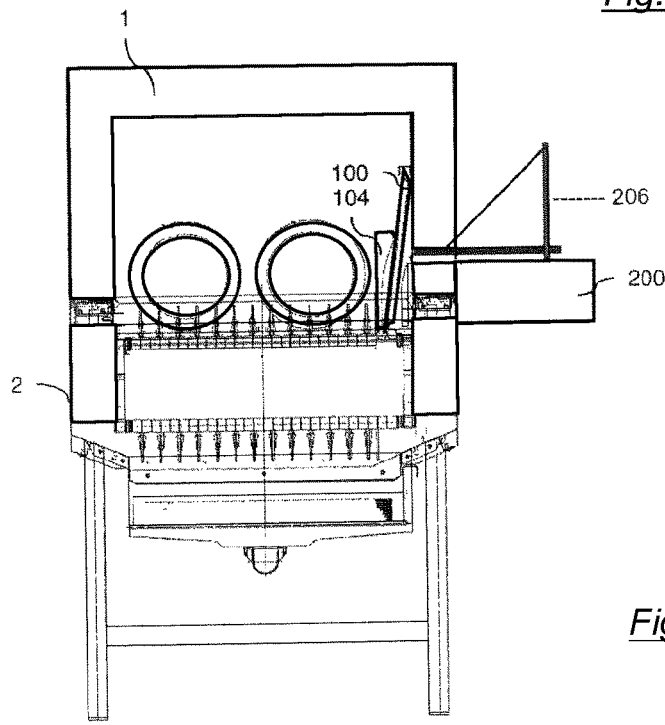
Figure 9A:
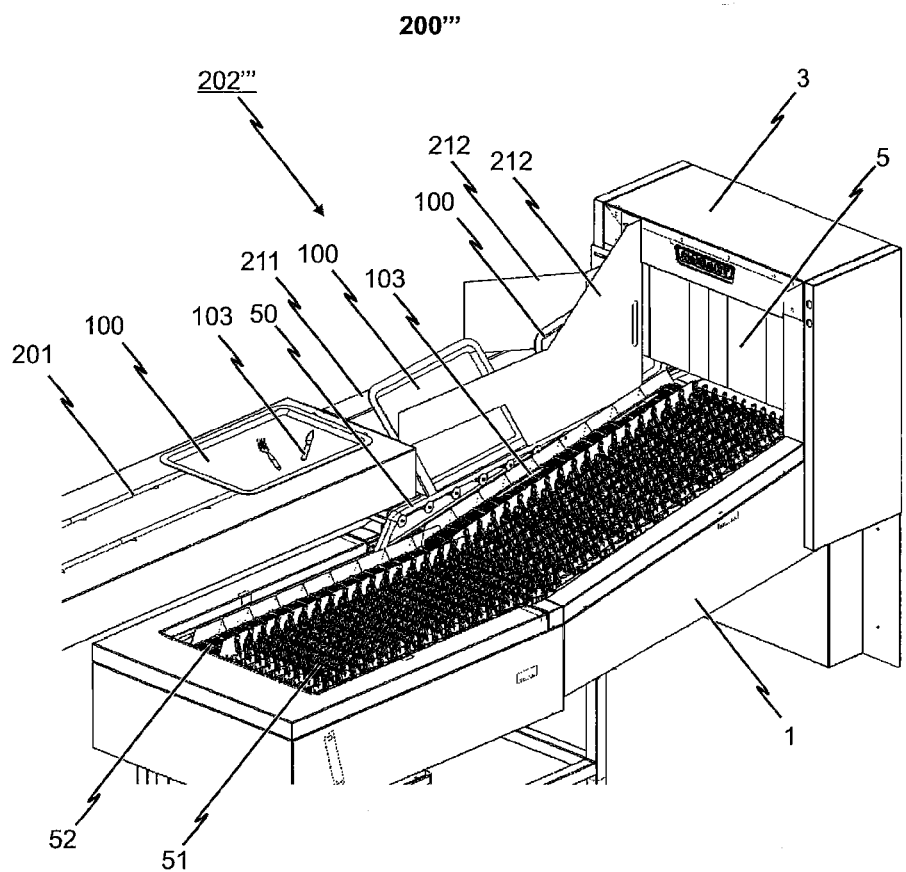
FIG. 9a shows a perspective view of the conveyor warewasher-side end region of a conveying apparatus according to a further exemplary embodiment.
Figure 9B:
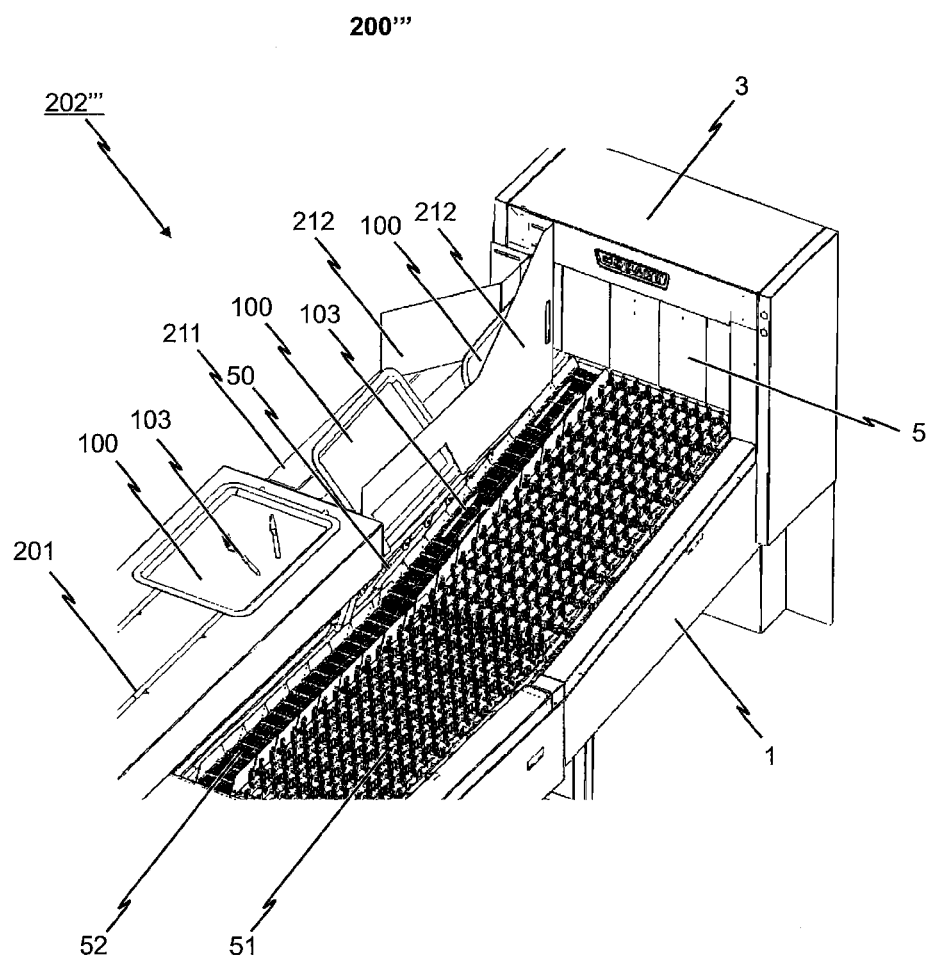

Finally, FIG. 8b shows a partially sectional longitudinal view of the combination of the conveying apparatus 200" according to the invention and of the flight-type warewasher 1 according to the invention, shown in FIG. 8a. What can be seen is the ramp 206 of the unloading station 202", via which the tray 100 is tipped along its conveying direction TF and finally slips into the conveyor belt 50 of the transport apparatus 2. Here, too, a further conveyor belt 52 running parallel and adjacently to the conveyor belt 50 may be provided for receiving cutlery 103, as already shown in FIGS. 3 and 4. The tipping system 202" with the ramp 206 is also simple to implement in structural terms and is nevertheless highly efficient, and moreover is likewise easy to clean. By simply changing over/swinging round the ramp 206 onto the opposite longitudinal side of the belt conveyor 201, it would also be possible to bring about unloading onto the other side of the belt 201. A corresponding technical implementation is familiar to a person skilled in the art.

Figure 10:
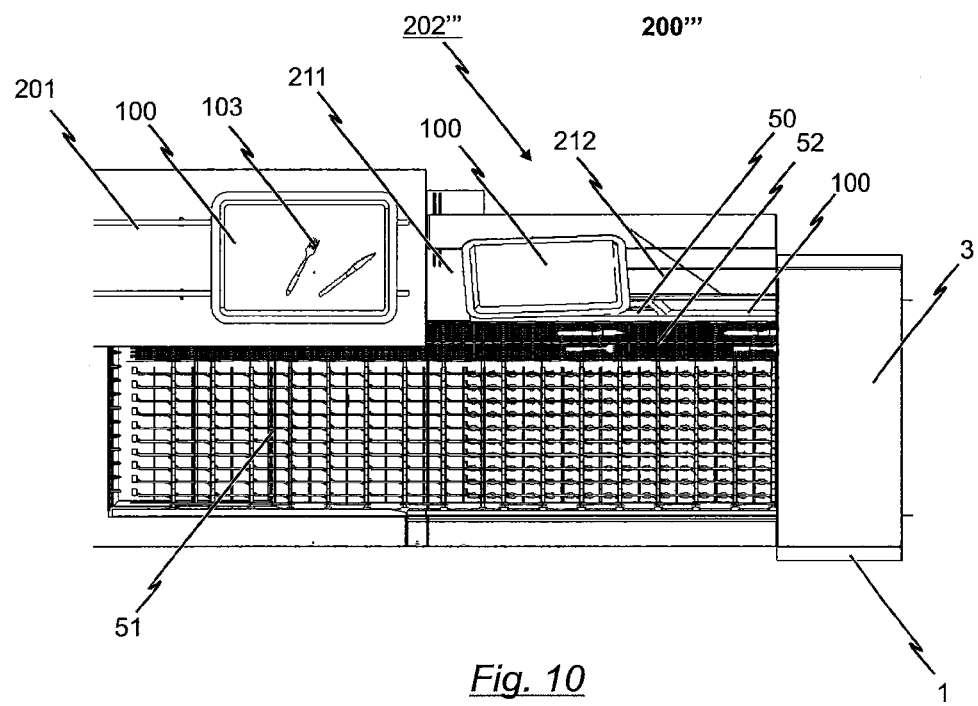
Figure 11:
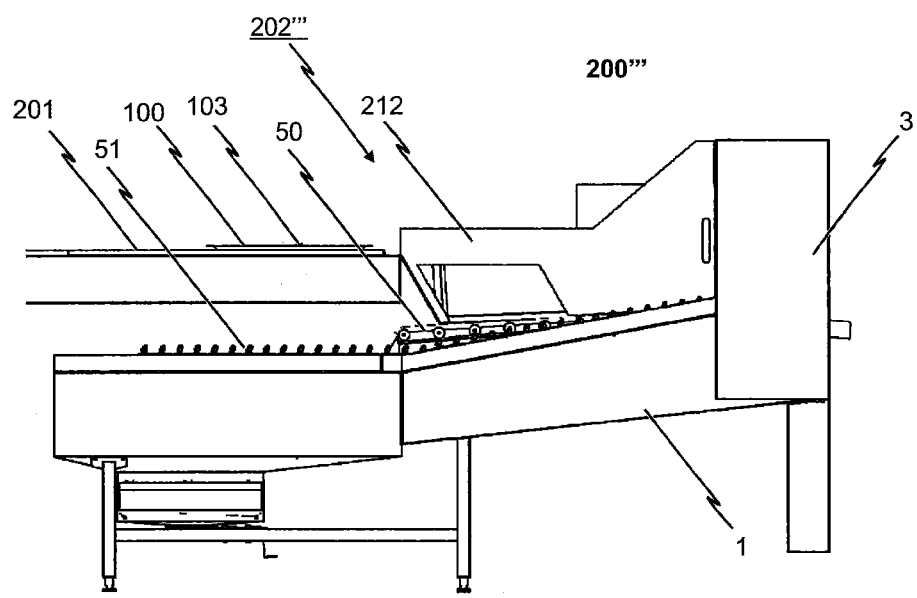

A further embodiment of the conveying apparatus 200''' according to the invention is described below with reference to the illustrations in FIGS. 9a, 9b, 10 and 11. In particular, the warewasher-side end region of the conveying apparatus 200''' is shown in each case in a perspective view in FIGS. 9a and 9b. FIG. 10 shows the warewasher-side end region of the conveying apparatus 200''' in a top view and FIG. 11 in a side view.

As in the exemplary embodiments described above, too, in the further embodiment, illustrated in FIGS. 9a, 9b, 10 and 11, of the conveying apparatus 200''', the washware to be treated in a conveyor warewasher 1 is fed with the aid of a conveying system 201, such as, for example, with the aid of a belt conveyor, to an unloading station 202''' at the machine incoming region of the conveyor warewasher 1. In the further embodiment, illustrated in the drawings, of the conveying apparatus 200''', the washware is a tray 100 on which cutlery articles 103 also lie.

For automatically unloading the washware 100, 103 from the conveying apparatus 200''', in the further embodiment a guide is provided which transfers the tray 100 at the warewasher-side end region of the conveying apparatus 200''' from its horizontally oriented normal stated into a state placed on edge. The guide is, in particular, a sliding surface 211 which is inclined in the direction of the conveyor belts 50, 51, 52 of the flight-type warewasher 1. The tray 100 is transported onto this sliding surface 211 with the aid of the conveying system 201. It is conceivable, for example, that the conveying system 201 ends at the start of the sliding surface 211, in which case the tray 100 then falls onto the sliding surface 211.

A tray 100 which is located on the sliding surface 211 is inclined in such a way that cutlery 103 possibly present on the tray 100 slips in the direction of the conveyor belts 50, 51, 52 of the flight-type warewasher 1. In particular, the angle of the sliding surface 211 with respect to the horizontal is selected such that the cutlery 103 slips down from the tray 100 and falls onto a corresponding cutlery conveyor belt 51 of the warewasher 1.

On the other hand, as soon as the tray 100 is located on the sliding surface 211, the lower edge of the tray 100 lies on a tray conveyor belt 50 of the flight-type warewasher 1 and is moved with the aid of this tray conveyor belt 50 in the transport direction TS of the conveyor warewasher 1.

The inclination of the sliding surface 211 increases in the direction of the incoming tunnel 3 of the conveyor warewasher 1, so that a tray 100 received on the sliding surface 211, when being transported into the conveyor warewasher 1, is transferred into its state placed on edge. For this purpose, corresponding lead plates or guide plates 212 are also provided at the machine inlet and assist the transfer of the trays 100 into the on-edge position.

It should be noted that the invention is not restricted to the exemplary embodiments illustrated above with reference to the drawings, but arises from an overall view of all the individual features disclosed herein.

The invention claimed is:

1. A conveying apparatus arranged to feed washware to at least one conveyor belt of a commercial conveyor warewasher, with the conveyor apparatus including a conveying system for conveying the washware and an unloading station, wherein the unloading station provides for automatically unloading the washware from the conveying system transversely to a conveying direction of the conveying system, such that trays, with or without cutlery lying on them, shift from lying in a flat condition on the conveying system and become oriented in an on-edge position on one side edge as the trays are placed onto a conveyor belt of the conveyor warewasher, with the one side edge resting on the conveyor belt and running in a direction that is parallel to a transport direction of the conveyor belt, wherein the transport direction of the conveyor belt runs parallel to the conveying direction of the conveying system;

wherein the unloading station comprises a tipping system with means for tipping the trays into the on-edge position in which the trays slip from the conveying apparatus, in a direction that is transverse to the conveying direction of the conveying system, and onto the conveyor belt for travel along the conveyor belt in the on-edge position.

2. The conveying apparatus as claimed in claim 1, in which the means for tipping the trays into the on-edge position comprises a tipping plate that tips about a tipping axis which is arranged laterally thereon and which is oriented parallel to the conveying direction of the conveying system.

3. The conveying apparatus as claimed in claim 2, in which a free end, lying opposite the tipping axis, of the tipping plate is deflectable either upward or downward, and pneumatic, hydraulic and/or electrical actuators are provided for moving the free end.

4. The conveying apparatus as claimed in claim 1, in which the unloading station comprises a clearance system for controlling a feed of the trays to the unloading station.

5. The conveying apparatus as claimed in claim 1, in which the unloading station is arranged at a longitudinal end of the conveying apparatus.

6. The conveying apparatus as claimed in claim 1, in which the conveying system is configured as a belt conveyor.

\* \* \* \* \*